March 24, 1936. O. P. ADAMS ET AL 2,035,039
APPARATUS FOR DETERMINING FLUID DENSITY
Filed Feb. 19, 1935 2 Sheets-Sheet 1

Inventors:
ORLANDO P. ADAMS, CLYDE D.
PHILLIPS and JOHN E. VORCE.
by:
their Attorneys.

March 24, 1936.  O. P. ADAMS ET AL  2,035,039
APPARATUS FOR DETERMINING FLUID DENSITY
Filed Feb. 19, 1935   2 Sheets-Sheet 2

Inventors:
ORLANDO P. ADAMS, CLYDE D.
PHILLIPS and JOHN E. VORCE.
by: their Attorneys

UNITED STATES PATENT OFFICE 2,035,039

APPARATUS FOR DETERMINING FLUID DENSITY

Orlando P. Adams, Irwin, Clyde D. Phillips, Pittsburgh, and John E. Vorce, McKeesport, Pa., assignors to National Tube Company, a corporation of New Jersey Application February 19, 1935, Serial No. 7,288

1 Claim. (Cl. 265—44)

This invention relates to apparatus for determining fluid density, one of the objects being to continuously analyze a gas or a mixture of gases for changes in density. Other objects may be inferred.

An example of this apparatus is illustrated by the accompanying drawings, in which.

Figure 1:
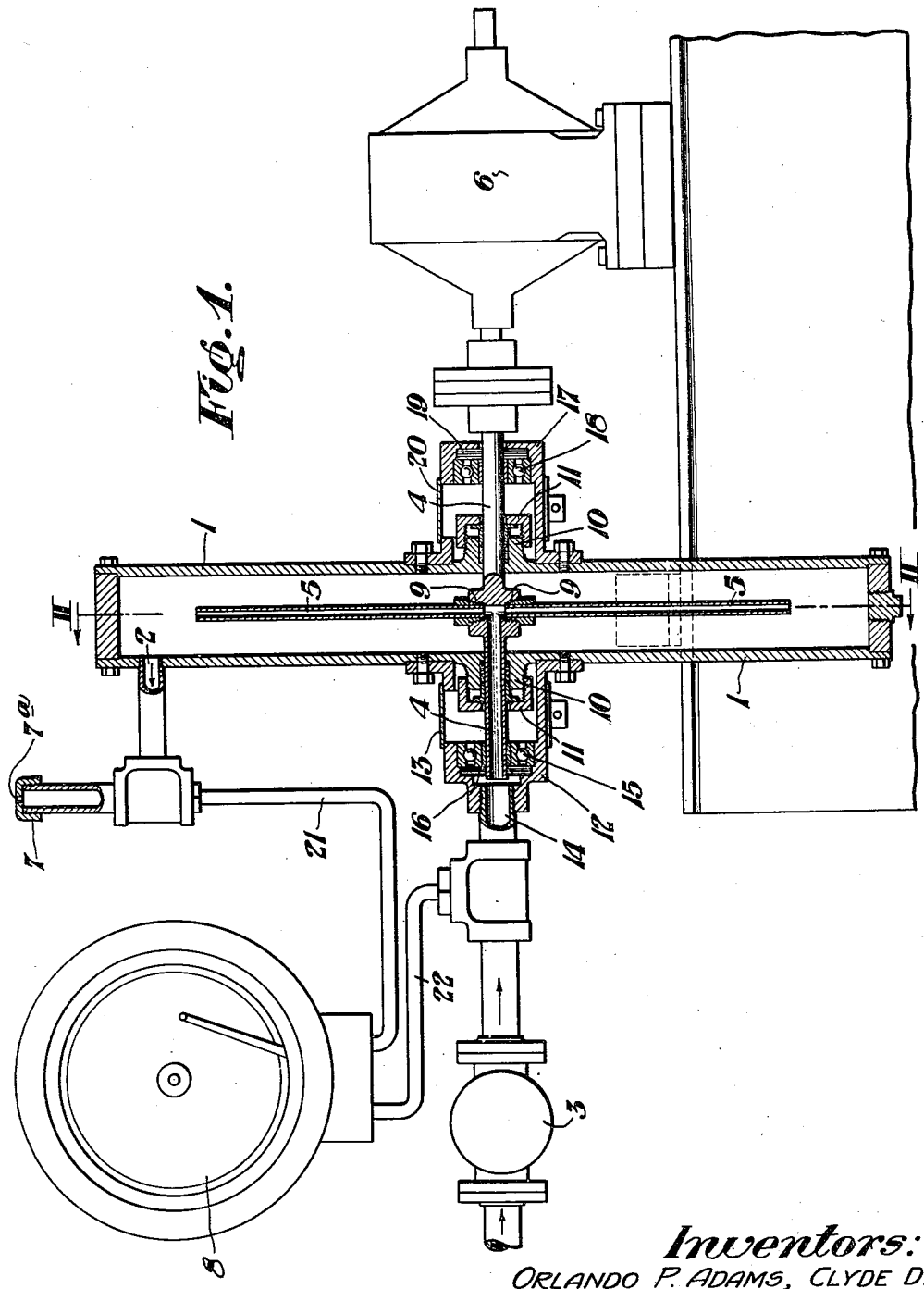
Figure 1 is a longitudinal section.
Figure 2:
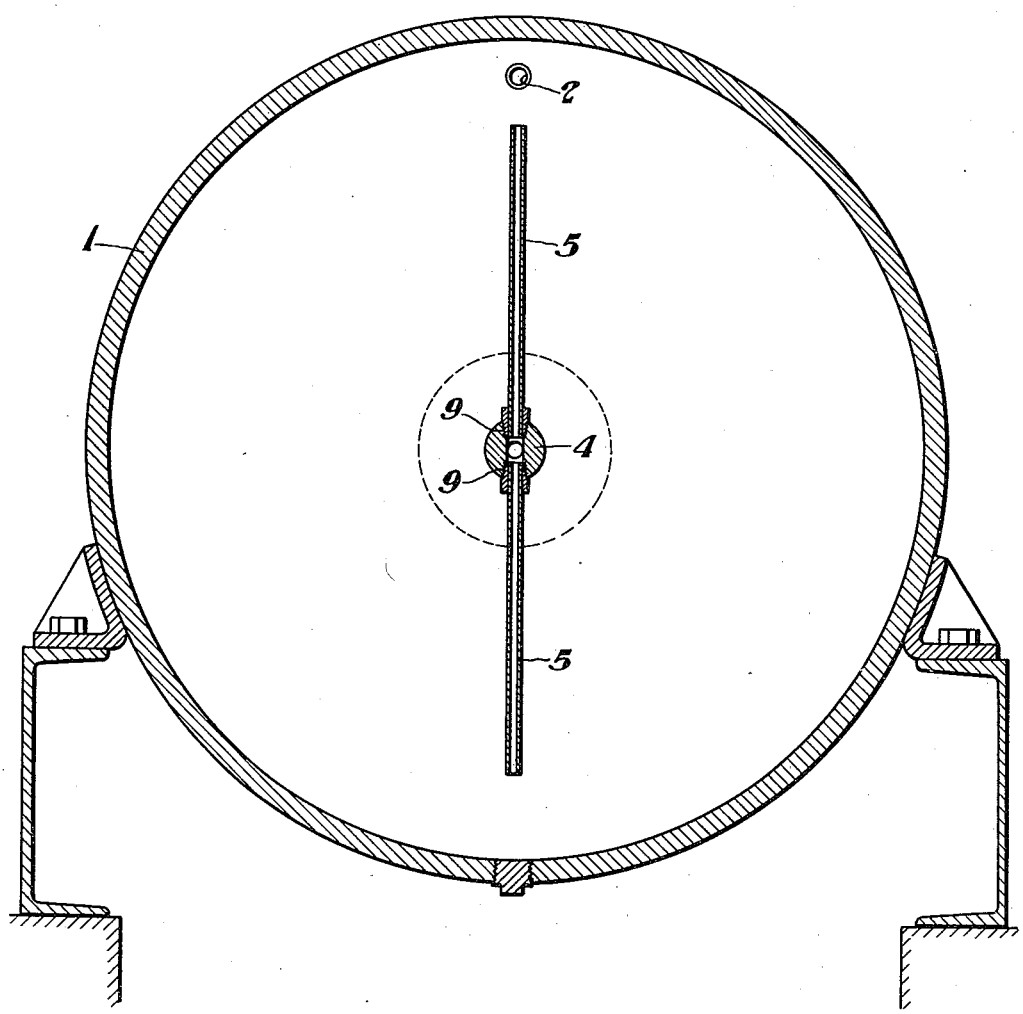
Figure 2 is a cross-section taken from the line II—II in Figure 1.

These drawings show a chamber 1 having an outlet 2, a pressure regulator 3 for providing a flow at a constant pressure of the fluid whose density is to be determined, a hollow shaft 4 extending into the chamber 1 and receiving the flow from the pressure regulator 3, tubular inlets 5 for the chamber 1 which are transversely fixed to the shaft 4 and communicate with the same, a synchronous electric motor 6 coupled to the shaft 4, a cap 7 which closes the outlet 2 so as to limit the flow of fluid through the same to a determinable rate and a differential pressure gage 8 which is connected with both the fluid flow from the pressure regulator 3 and the chamber 1, the dial of this pressure regulator being preferably calibrated in terms of density rather than pressure.

In operation, the pressure regulator 3 provides a flow of the gas or mixture of gases whose density is to be determined. This flow is introduced to the chamber 1 by way of the inlets 5 which are rotated at a constant speed by the motor 6 and which, therefore, introduce these gases to this chamber under the impelling influence of a constant rotative speed. It should be noted that both the pressure of flow and the rotative speed are of constant value. It follows that the only thing which will cause a pressure variation in the chamber 1 will be a variation in the weight of gas, or mixture of gases proceeding through the tubes 5. Such a variation is indicated by the pressure gage 8. As previously explained, this pressure gage may read directly in terms of density. Although shown as an indicator, it should be understood that the apparatus is applicable in any instance where it is desired to control any operation or effect upon a variation of a fluid density. Thus, in many cases it may be desirable to substitute controlling apparatus of various types for the pressure gage 8.

The mechanical details of the apparatus will now be described more specifically.

The shaft 4 extends completely through the chamber 1 and projects beyond both sides of the latter. This shaft is only hollow from one of its ends to a point within the chamber, and the tubular inlets 5 are straight sections of pipe which are right angularly fixed to the shaft 4 by screw-connections, as at 9. The arrangement is such that the tubular inlets open into the hollow portion of the shaft 4.

Stuffing boxes 10 seal the shaft 4 where it passes through the ends of the chamber 1, these being of the adjustable character provided with packing nuts 11.

A chamber 12 having an open side provided with a removable closure 13 encloses the hollow projecting portion of the shaft 4 and the end of this portion, a conduit 14 which opens into the end of this chamber 12 providing means for introducing the flow of fluid from the pressure regulator 3 to this chamber. An anti-friction bearing 15 supports the end portion of the shaft 4 in this chamber 12, and an oil seal 16 is provided between the open end of this portion of the shaft and this anti-friction bearing.

A somewhat similar chamber 17 encloses a part of the solid projecting portion of the shaft 4 and mounts the latter through an anti-friction bearing 18 arranged in its end away from the chamber 1, an oil seal 19 also being provided for this latter bearing. This chamber 17 also has an open side provided with a closure 20.

The differential pressure gage 8 is connected by a conduit 21 to the outlet 2 and by a conduit 22 to the conduit 14. Also, it should be understood that the cap 7 is provided with an orifice 7a of a size suitable to the probable density range of the particular fluid with which the apparatus is to be used, and that other caps may be provided with differently sized orifices for use with fluids having different density ranges.

The chambers 12 and 17 function to prevent the escape of fluid which might leak through the stuffing boxes 10, and their construction is such that the removal of their respective closures 13 and 20 permit ready access to the stuffing boxes to permit their adjustment. The bearings 16 and 18 function to relieve these stuffing boxes from the strain of supporting the shaft 4.

We claim:

Apparatus for determining fluid density, including the combination of a chamber having an outlet, means for providing a flow at a constant pressure of the fluid whose density is to be determined, a shaft extending through said chamber and projecting therebeyond, said shaft being hollow from one of its ends to a point within said chamber, at least one tubular inlet for said chamber which is right angularly fixed to said shaft in communication with its hollow portion, adjustable means for sealing said shaft where it passes through said chamber, a chamber having an open side provided with a removable closure for enclosing the hollow projecting portion of said shaft and the end of this portion, means for introducing said flow to the second named chamber, a bearing in said second named chamber for said hollow projecting portion of said shaft, a bearing for the other projecting portion of said shaft, a synchronous electric motor coupled to said other projecting portion of said shaft and means operable by the pressure in said chamber for determining the density of said fluid.

ORLANDO P. ADAMS.
CLYDE D. PHILLIPS.
JOHN E. VORCE.